United States Patent
Driemeyer et al.

(10) Patent No.: US 8,583,724 B2
(45) Date of Patent: Nov. 12, 2013

(54) SCALABLE, MULTI-USER SERVER AND METHODS FOR RENDERING IMAGES FROM INTERACTIVELY CUSTOMIZABLE SCENE INFORMATION

(75) Inventors: Thomas Driemeyer, Berlin (DE); Rolf Herken, Berlin (DE)

(73) Assignee: Nvidia Corporation, Santa Clara, CA (US)

(*) Notice: Subject to any disclaimer, the term of this patent is extended or adjusted under 35 U.S.C. 154(b) by 700 days.

(21) Appl. No.: 12/398,638

(22) Filed: Mar. 5, 2009

(65) Prior Publication Data

US 2009/0172561 A1      Jul. 2, 2009

Related U.S. Application Data

(63) Continuation of application No. 09/844,511, filed on Apr. 28, 2001, now abandoned.

(60) Provisional application No. 60/200,564, filed on Apr. 28, 2000.

(51) Int. Cl.
    *G06F 15/16*      (2006.01)

(52) U.S. Cl.
    USPC .......................................................... 709/203

(58) Field of Classification Search
    USPC .......................................................... 709/203
    See application file for complete search history.

(56) References Cited

U.S. PATENT DOCUMENTS

| | | | |
|---|---|---|---|
| 5,202,987 A | 4/1993 | Bayer | |
| 5,742,289 A | 4/1998 | Naylor | |
| 5,761,663 A | 6/1998 | Lagarde | |
| 5,968,167 A | 10/1999 | Whittaker | |
| 6,232,974 B1 * | 5/2001 | Horvitz et al. | 345/419 |
| 6,266,053 B1 * | 7/2001 | French et al. | 715/255 |
| 6,310,627 B1 | 10/2001 | Sakaguchi | |
| 6,525,731 B1 * | 2/2003 | Suits et al. | 345/427 |
| 6,570,578 B1 * | 5/2003 | Smirnov et al. | 345/629 |
| 6,798,417 B1 * | 9/2004 | Taylor | 345/502 |

FOREIGN PATENT DOCUMENTS

| | | |
|---|---|---|
| EP | 0899672 | 3/1999 |
| EP | 0933728 | 8/1999 |
| WO | 9930500 | 6/1999 |

OTHER PUBLICATIONS

Chaddah, "Model-based Compression", IEEE, Sep. 16, 1996, pp. 417 et seq.
Wallach, "Accelerated MPEG compression of dynamic polygonal scenes", SIGGRAPH, Jul. 24, 1994, pp. 193 et seq.
Bajaj, "Web based collaborative CAAD", Proceedings of the Fifth ACM Symposium on Solid Modeling and Applications, Jun. 1999.

\* cited by examiner

*Primary Examiner* — John MacIlwinen
(74) *Attorney, Agent, or Firm* — Jacobs & Kim LLP; David Jacobs

(57) ABSTRACT

A server for use in connection with a network including at least one client and a communication link interconnecting the client and server. The server comprises a user interaction control module, an image rendering module and an interface. The image rendering module is configured to render, from three-dimensional scene data representing a scene, a two-dimensional image. The interface configured to transmit the two-dimensional image over the communication link to the client. The user interaction control module is configured to regulate interactions between the server, in particular the image rendering module, and respective clients who may be using the server concurrently to control images in which customizations requested by, for example, respective clients are rendered.

13 Claims, 3 Drawing Sheets

SCALABLE, MULTI-USER SERVER AND METHODS FOR RENDERING IMAGES FROM INTERACTIVELY CUSTOMIZABLE SCENE INFORMATION

CROSS-REFERENCE TO RELATED APPLICATIONS

This application for patent is a Continuation of U.S. patent application Ser. No. 09/844,511 filed Apr. 28, 2001, which claims the priority benefit of U.S. Provisional App. 60/200,564 filed Apr. 28, 2000, each of which is incorporated by reference herein as if set forth in its entirety herein.

FIELD OF THE INVENTION

The invention relates generally to the fields of computer graphics and distribution of information in graphical form, generally in the form of rendered images, over networks such as the Internet. The invention provides a new and improved scalable, multi-user server and method for rendering images from interactively customizable three-dimensional scene information.

BACKGROUND OF THE INVENTION

Devices, such as computers, personal digital assistants (PDA's), cellular telephones, and the like, that can generate, process, display and otherwise make use of information in digital form, are often connected into networks to facilitate sharing of information thereamong. In some networks, so-called local area networks (LAN's), the networks extend over a relatively small geographic region, such as a building or group of buildings. Other networks, so-called wide area networks (WAN's), the networks extend over larger geographical regions, and may include LAN's as parts thereof. Some networks are private, maintained by an organization such as a corporation, government agency and the like, and may be accessed only by, for example, employees and other authorized people. On the other hand, some networks, such as the Internet or World Wide Web, are public and typically may be accessed by anyone who has access to a suitable digital device and network connection.

A number of types of paradigms and protocols exist for transferring information over a network, such as a WAN such as the Internet and World Wide Web (generally, "Internet"), or a LAN ("Intranet"). One paradigm is the so-called client/server paradigm, in which some devices, which are referred to as servers, store digital information that may be retrieved by other devices, which are referred to as clients. Several protocols exist for retrieving information, including the so-called file-transfer protocol ("FTP") for facilitating the retrieval of individual information files for, for example, later processing, and the HyperText transfer protocol ("HTTP") for facilitating the retrieval of one or more information files, at least one of which will be in the so-called HyperText Markup Language ("HTML"), all of which constitute a Web page. Typically, Web pages include textual and graphical information that is to be displayed on a display provided by the client device.

One popular type of program that is often used for retrieving and using information files comprising a Web page is referred to as a browser. A browser provides a convenient mechanism by which a user can identify the particular item of information that is to be downloaded, by providing a "URL," or "universal resource locator." A URL is identifies a computer, network domain or Web site (generally, "web site") from which the item of information is to be retrieved, and may also specify a particular item of information that is to be retrieved. Typically, URL's are in relatively user-friendly form, typically identifying at least the Web site by name or a mnemonic of the name of the person or organization that maintains the Web site. The browser will convert at least the portion of the URL that identifies the web site to a network address, which is typically in numerical form, which it uses to contact the Web site and establish a "connection" therewith. A browser may need to contact another device, referred to as a name server, that maintains a concordance between URL's and network addresses, to obtain the network address. After the browser has the web site's network address, it can use the network address, the identification of the particular item of information that is to be retrieved, and possibly other parameters to establish a connection with the Web site and initiate retrieval of the information item.

A browser typically retrieves information in the form of documents or "Web pages," which may include text and graphical images, and may also include streaming video and audio information. The textual information is specified in one of a number of document description languages, typically in the well-known HyperText Markup Language (HTML). If a Web page is to have one or more graphical images and/or video information displayed therewith, the HTML description identifies the locations on the Web page at which the images or streaming video information are to be displayed and the sizes of regions of the Web page on which the respective images or video information are to be displayed. In addition, the HTML description will provide URL's for the respective images and streaming video information. Similarly, if the Web page is to be displayed along with audio information, the HTML description will specify the audio information that is to be played.

As the browser displays the Web page on the computer's video display screen, it will display the text as specified in the HTML description, in the process reserving regions of the displayed Web page on which the respective images are to be displayed. In addition, the browser will retrieve the graphical images, using the provided URL's provided in the HTML description in a manner similar to that described above, and display them in the regions on the video display screen that were reserved therefor. Furthermore, if streaming video information is to be displayed, the browser can initiate retrieval of the streaming video information either while displaying the other elements of the Web page or at some point after the Web page has been displayed. The user may need to perform some action, such as actuating a pushbutton displayed on the Web page. A pushbutton can be actuated in any of a number of ways, including clicking on it using a pointing device such as, for example, a mouse, pressing on the region of a touch screen on which the pushbutton is displayed by, for example, a stylus, or any other mechanism for actuating a pushbutton displayed on a video display screen as will be appreciated by those skilled in the art. Audio information may be retrieved in a manner similar to the streaming video information and played through an audio reproduction device, such as a speaker, provided with the computer.

In addition to text, image, streaming video and audio information, a Web page may also be associated with programs, termed "applets," that may be retrieved with the other types of information and executed under control of the browser.

Generally, the Web pages that are currently displayed by browsers are static documents. That is, a user, through the browser, requests a Web page, and the browser retrieves the information associated with the Web page and displays it. Essentially, when the Web site has provided the information associated with the Web page, that essentially ends the transaction between the browser and the Web site in relation to that Web page. If the user wishes to retrieve another Web page from the same Web site, he or she may do so by, for example, entering another URL or actuating a link on the Web page that is currently being displayed, which will initiate another transaction.

Typically, a user cannot modify or customize the way a Web page is displayed, unless an image depicts a scene that is to be displayed in three-dimensional form, in, for example VRML or X3D format. For such images, by actuating controls that may be provided on the Web page, a user can enable the three-dimensional scene to be displayed from a number of orientations. While this can be useful in some situations, there are a number of limitations that make it less than optimum. For example, the amount of information required to define objects in a three-dimensional scene in any significant degree of detail can be quite large, and, given bandwidth limitations that are typical in many connections to the World Wide Web, it would require an inordinate amount of time to retrieve the information required to display the three-dimensional scene if the scene has any significant degree of detail. Accordingly, typically for three dimensional scenes, the amount of image information will be limited sufficiently so that the three-dimensional scenes have only a few relatively small objects and textures, with an extremely limited range of illumination and surface property effects. In addition, although a user can change the viewpoint from which the scene is displayed, he or she cannot change the orientation or a number of other characteristics of the objects in the scene.

Even if the bandwidth were sufficient to enable sufficient three-dimensional scene information to be retrieved within a reasonable amount of time to facilitate display of the scene with a more photo-realistic quality, in a number of situations it may be undesirable to transfer the information to the user. For example, if a manufacturer uses the Web site to provide information about its products for, for example, potential customers, it may not wish to make information sufficient to provide photo-realistic three-dimensional images available for retrieval, since information that is sufficiently detailed to generate such images may also be sufficiently detailed to provide a significant amount of design information that may be of interest to competitors. This is particularly the case if the information is sufficiently detailed to allow a user to modify or customize the scene. For example, if the manufacturer is an automobile manufacturer, it may be desirable to allow a user to not only view the automobile from user-selectable orientation, but also to modify or customize the scene, by, for example, changing the color and texture of various surfaces, changing the positions of light sources, enable the automobile to be displayed with doors, hood and/or trunk in an open position, and the like. The amount of information that would be necessary to allow a user to perform such operations may require a significant amount of time to transfer. In addition, the amount of information that may be required may constitute a significant amount of the design information for the object(s) in the scene, which may be confidential.

Accordingly, it will be desirable to maintain the three-dimensional scene information on the Web site and have the Web site render two-dimensional images in orientations and with modifications and customizations of the scene as specified by the user, and transmit the two-dimensional image information to the user's browser for display. However, problems arise since not only will the Web site need to retrieve the information from databases on which the information is stored for transmission to the user's browser, but need also render the two-dimensional images from orientations and with modifications and customizations specified by the user.

For example, if a number of users are accessing the Web site concurrently, the amount of processing power required to render the images in a reasonable amount of time can become quite large. In addition, problems can arise if a group of users are making use of the same scene, for whom customizations made by any of the users in the group are to be incorporated into the scene as used by all of the members of the group, since all of the customizations would need to be transmitted to all of the users and incorporated into their respective three-dimensional scenes.

SUMMARY OF THE INVENTION

The invention provides a new and improved scalable, multi-user server and method for rendering images from interactively customizable three-dimensional scene information.

In brief summary, the invention provides a server for use in connection with a network including at least one client and a communication link interconnecting the client and server. The server comprises an image rendering module and an interface. The image rendering module is configured to render, from three-dimensional scene data representing a scene, a two-dimensional image. The interface configured to transmit the two-dimensional image over the communication link to the client.

The server is also provided with a user interaction control module that regulates interactions between the server, in particular the image rendering module, and respective clients who may be using the server concurrently to control images in which customizations requested by, for example, respective clients are rendered.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
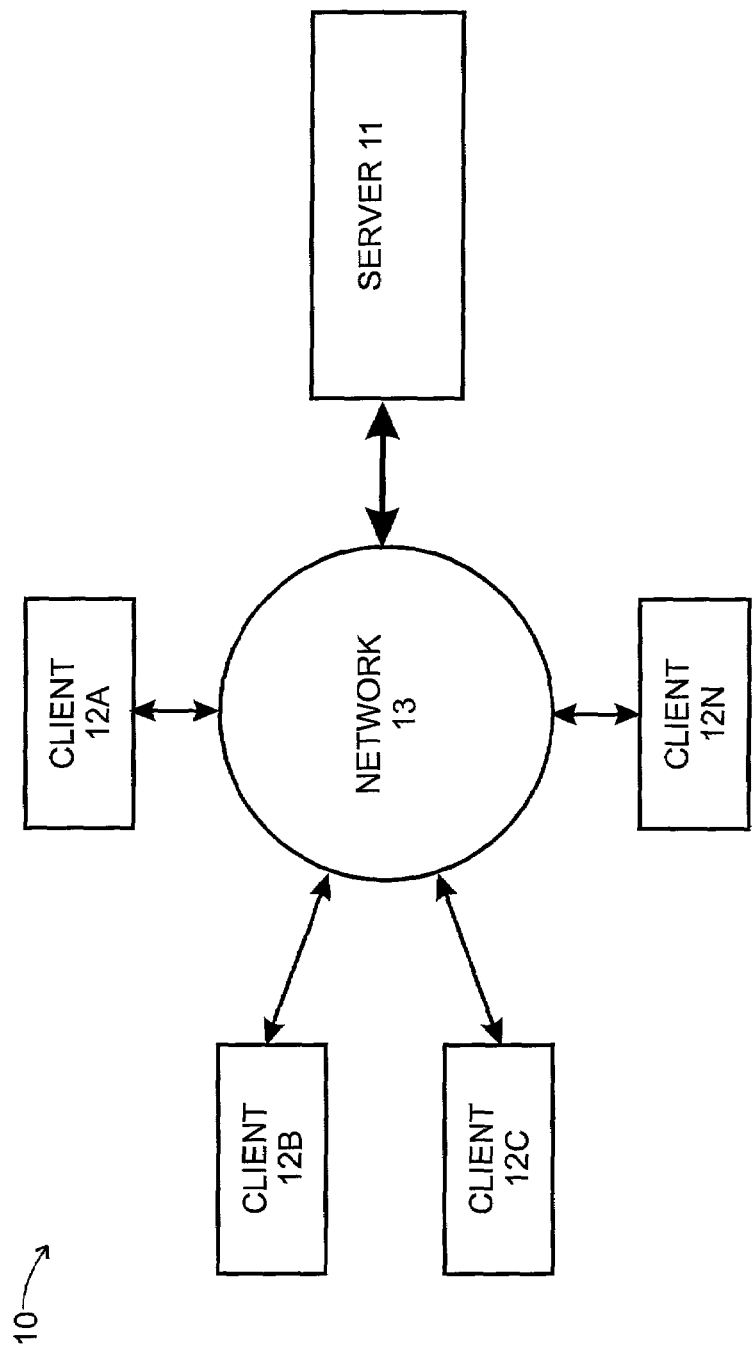
FIG. 1 is a functional block diagram of an arrangement including a scalable multi-user server that provides for rendering of images based on scenes that can be interactively customized by clients, constructed in accordance with the invention.

FIG. 1 is a functional block diagram of an arrangement 10 including a scalable, multi-user server 11 that provides for rendering of images based on scenes that can be interactively customized by clients, constructed in accordance with the invention. The server 11 provides web pages, including text and images, individual images, sequences of images, streams of images that provide for the perception of continuous motion of rendered scene elements (generally, "streaming video"), and the like to the respective clients. With reference to FIG. 1, in addition to the server 11, arrangement 10 includes a plurality of client devices 12A, . . . , 12N (generally identified by reference numeral 12n) that can access the server 11 over a network 13. In one embodiment, the network 13 is a wide area network (WAN) such as the Internet and World Wide Web, but it will be appreciated that an arrangement in accordance with the invention can include any form of network, including local area networks (LANs). The client devices 11n may be any kind of information utilization devices that may receive, utilize and display information in digital form, including computers such as personal computers, workstations, personal digital assistants (PDA's), cellular telephones and the like. The server 11 can be implemented using, for example, a suitably-programmed computer.

Generally, the client devices 12n and server 11 communicate over the network 13 according to a client/server communication model. According to that model, a client, such as a client device 12n, generates an information retrieval request that requests retrieval of a particular item or items of information from the server 11, and transmits it to a server, such as the server 11, over the network 13. The information retrieval request may be generated in response to input provided by an operator, in response to a request generated by a program, or in response to other occurrences as will be apparent to those skilled in the art. When the server receives an information retrieval request from a client, depending on the information whose retrieval is being requested, it may obtain the information item(s) from, for example, a database that it maintains, and transmit them to the client over the network 13. When the client receives the information item(s), it can make use of the item(s) in any of a number of ways. If, for example, the information item(s) comprise a Web page, the client device can display the Web page on a display device, store the Web page in a storage device, provide the web page through a suitable editor to a user to allow him or her to edit the Web page and so forth. The uses to which a client device 12n may put other types of information item(s) will be apparent to those skilled in the art. If a Web page comprises several components, including one or more textual components, images and the like, a client device 12n may need to generate multiple information retrieval requests each requesting retrieval of one or more of the Web page's components. All of the information retrieval requests for the various components of the Web page may be transmitted to the same server, such as server 11, for response. On the other hand, one or more of the information retrieval requests for various ones of the components of the Web page may be transmitted to other servers (not shown), which can provide the respective components. As the respective client 12n that issues the information retrieval request(s) receives the requested information, or at some point thereafter, it can make use of the information, and, if the requested information is a Web page, display the Web page.

The invention provides an arrangement whereby a server, such as the server 11, can provide Web pages to client devices 12n, which Web pages contain two-dimensional images that are rendered from three-dimensional scenes. The invention further provides an arrangement whereby a server, such as the server 11, can provide images rendered from three-dimensional scenes, which scenes can, in turn, be interactively modified or customized (generally "customized") during a session in response to customization input from a user who is using a respective client device 12n', or a user who is another client device 12n". A number of clients 12n', 12n", . . . may request images of, for example, the same scene contemporaneously, from the same or different viewing directions, and the server 11 can efficiently render the images and transfer them to the respective clients 12n', 12n" for use thereby. A client device 12n' can request customizations to the scene, and the server 11 can selectively enable the requested customizations to be depicted only in images, sequences of images, or images comprising streaming video, that are rendered for that client device 12n'. Alternatively, the server 11 can selectively enable the customizations requested by one client device 12n' to be depicted in images, sequences of images, or images comprising streaming video, that are rendered for selected ones of the client devices 12n', 12n", . . . that are contemporaneously engaged in sessions involving the same scene. As a further alternative, the server 11 can enable the customizations requested by one client device 12n' to be depicted in images, sequences of images, or images comprising streaming video, that are rendered for all of the client devices 12n', 12n", . . . that are contemporaneously engaged in sessions involving the same scene. In all cases, the images provided by the server 11 may be still images, sequences of images, streaming video, or any other form or arrangement by which images can be provided to a client device.

Generally, during a session, the user will initially initiate retrieval of a Web page from the server 11, which Web page will include an image. The Web page also provides a set of tools, which can be displayed as, for example, push buttons, dial objects, radio buttons, dialog boxes and the like as part of the Web page. During the session, the user, using user input devices provided by his or her client device 12n', can manipulate the tools to enable customizations to be made to the scene, customizations to be made the viewing direction, and/or types of customizations as will be apparent to those skilled in the art, which can be made to a scene and how an image of the scene is rendered. The client device 12n' can transmit indicia indicating the customizations that were requested by the user to the server 11, which, in turn, can generate a new image reflecting the customizations, and transmit the new image to the user's client device. As the client device 12n' receives the new image, or at some point thereafter, it can substitute the new image for the previous image in the Web page. These operations can be repeated during a session in response to user customization requests. Similarly, if the customizations requested by a user using one client device 12n' are to be depicted in images rendered for other client devices 12n", . . . contemporaneously engaged in a session involving the same scene, the server 11 can render new images depicting the customizations and transmit them to the other client devices 12n", . . . for display. In addition, particularly in the case of image sequences, streaming video, or the like, the server 11 can provide sequences of images or streaming video to a respective clients without requiring user customization requests or other requests therefrom using a so-called "push" methodology.

A server, such as the server 11, can be used in a number of environments. For example, the server 11 can be used as a server maintained by a marketer or seller of a product, and can provide Web pages containing images of the product. During a session during which the user may, for example, wish to receive information concerning the product, the user may wish to request customizations to the image, such as the orientation of the product from which the product is displayed in the image, the position of the light source, the color of the product within, for example, a set of colors in which the product is offered, and/or other types of customizations and be provided with an image with the customizations. If the product is, for example, an automobile, types of customizations may also include changes in which the automobile is displayed, including, for example, the positions of one or more of the doors, illustratively, open or closed, the positions of the hood or trunk. If the automobile has a sun- or moon-roof or a convertible top, customizations may also include displaying the roof or top in a number of orientations. Since the server 11 has the database of the scene from which the image is rendered, it can readily provide a rendered images with the requested customizations without needing to provide any information from the database to the user's client device 12$n'$. Accordingly, if the product is, for example, an automobile, the scene database used by the server 11 can include information from the product design database maintained by the manufacturer, and, since neither the scene database nor the information from the product design database is provided to the user's client device 12$n'$, trade secret information that may be present in the information contained in the product design database will not be transferred to a device that is external to the server 11. This also reduces the amount of effort required to provide the scene database for the server 11, since information from the product design database can be used generally directly or with few modifications in the scene database.

As noted above, the server 11 can be advantageously used in connection with sessions with multiple client devices 12$n'$, 12$n''$, . . . , contemporaneously, in connection with requests for images generated for the same product and using the same scene database. The server 11 can selectively provide that customizations requested by a user using one client system 12$n'$ not be visible in images rendered using the same scene database for a user using another client system 12$n''$ who has not requested similar customizations. Thus, if, for example, only the user using client system 12$n'$ has requested a customization in which, with reference to the preceding example in which server 11 is used to provide images of an automobile, the position of the driver's side door is changed from being closed to being open by a selected amount, the server 11 will provide an image in which the driver's side door is open only to the client system 12$n'$, reflecting the customization requested only by him or her, and not to the other client systems 12$n''$, . . . , even in images transmitted to the other client systems 12$n''$, . . . , subsequent to the customization requested by the user of client system 12$n'$. Similarly, if the user using client system 12$n''$ has requested a customization in which the color of the automobile is changed from white to red, the server 11 will provide an image in which the color of the automobile is red, reflecting the customization requested only by him or her, and not to the other client systems 12$n'$, 12$n''$, . . . even in image transmitted to the other client systems 12$n'$, 12$n''$, . . . subsequent to the customization requested by the user of client system 12$n''$. In that case, the server 11 keeps track of changes to the scene database resulting from the requests from the individual client devices 12$n'$, 12$n''$, . . . , on a client-by-client basis.

On the other hand, as also noted above, the server 11 can selectively provide that customizations requested by a user using one client system 12$n'$ are visible in images rendered using the same scene database for users using other client systems 12$n''$, 12$n'''$, . . . , concurrently engaged in sessions with the server 11 in connection with the same scene database, regardless of whether the latter users have requested similar customizations. The customizations may be visible in images rendered for all or a subset of the other client systems 12$n''$, 12$n'''$, . . . . Thus, in that case, if a user using client system 12$n'$ has requested a customization in which, with continued reference to the preceding example in which server 11 is used to provide images of an automobile, the position of the driver's side door is changed from being closed to being open by a selected amount, the server 11 will provide an image in which the driver's side door is open to all or a selected subset of the client systems 12$n'$, 12$n''$, . . . . The server 11 can provide the image with the customization to the other client systems 12$n''$, 12$n'''$, . . . that are contemporaneously engaged in a session with the server 11 in connection with the same scene database in response to a request therefor from each respective other client system 12$n''$, 12$n'''$, . . . , which request may also include a request for a further customization. Alternatively, the server 11 can, after or contemporaneous with providing the image with the customization to the client system 12$n'$ that requested the customization, also transmit the image to all or a selected subset of the other client devices 12$n''$, 12$n'''$, . . . that are engaged in a session involving the same scene database, without a request therefor from the other respective client devices. In that case, after a client device 12$n'$, 12$n''$, 12$n'''$, . . . receives the image with the customization, it can substitute the image in the Web page.

If the server 11 provides images with a customization, not only to the client system 12$n'$ that requested the customization, but also to all or a selected subset of the other client devices 12$n''$, 12$n'''$, . . . that are engaged in a session involving the same scene database, without a request therefor from the other respective client devices, the server 11 can also find utility in, for example, managing cooperative or competitive efforts by a plurality of users using respective ones of the client devices 12$n'$, 12$n''$, . . . . For example, the server 11 can be advantageously used to allow a plurality of users, in diverse locations using respective client devices to cooperatively design a product. In that case, as the users enter customizations to a product, which can include, for example, providing an initial design one or more components of the product, the server 11 can enter information defining the components in the scene database. At some point, some or all of the information in the scene database may be converted to a product design database, which may be used in fabricating the product.

In addition, the server 11 can be used in connection with playing of video games over the network 13. In that case, the server 11 can render images of a scene used in the came from the same orientation for all of users who are playing the game, or from unique orientations for ones of the users. As the users play the game over time, the server 11 can render successive images for the various users and transmit them to their respective client devices 12$n'$, 12$n''$, . . . for display.

Figure 2:
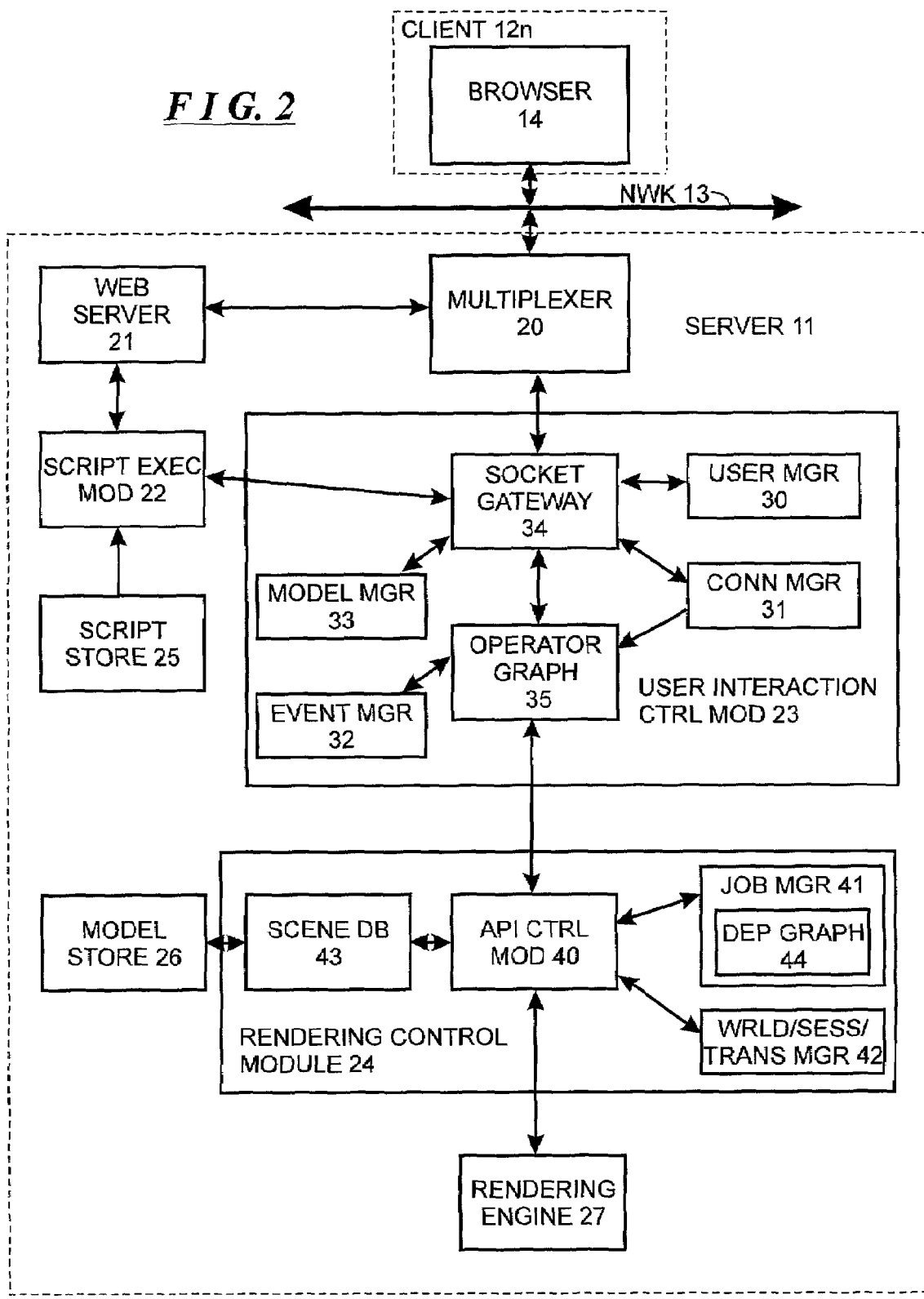
FIG. 2 is a functional block diagram of the server depicted in FIG. 1.

FIG. 2 depicts a functional block diagram of server 11 constructed in accordance with the invention. With reference to FIG. 2, the server 11 includes a number of components including a multiplexer module 20, a web server module 21, a script execution module 22, a user interaction control module 23, a rendering control module 24, a script store 25, a model store 26 and a rendering engine 27. The multiplexer module 20 connects to the network 13 and receives information retrieval requests from a user's client device 12$n$. Generally, a user using client device 12$n$ will provide input entered through, for example, a user input device to input request information to a browser 14, and the browser will generate one or more information retrieval requests for transmission to the server 11 requesting retrieval of a Web page. The multiplexer 20, in turn, receives information retrieval requests, which may be a Web page retrieval request or, as will be described below, an image retrieval request, from the network 13. When the multiplexer 20 receives an information retrieval request from the network 13, it will either respond to the Web page retrieval request itself, or it will transfer the request to one of the web server 21 or the user interaction control module 23. If the information retrieval request is the first request from the browser for a session, the multiplexer 20 will generate a response that includes a user identification (UID) for the session, and transmit the response to the client device 12$n$ for use by the browser 14. Subsequent information retrieval requests generated by the browser 14 for transmission to the image rendering device 11 for the session will include the UID, and the image rendering device 11 will use the UID to identify the session and keep track of the particular user for which images and customizations have been requested during the session.

After the browser 14 receives the response, including the UID, generated by the multiplexer 20 and transmitted thereby over the network 13, the browser 14 will generate a new Web page retrieval request for transmission by the client device 12n to the server 11. The new Web page retrieval request will generally correspond to the previous Web page retrieval request, except that it will also include the UID received in the response that had previously been received from the multiplexer 20. When the multiplexer 20 receives a Web page retrieval request from the client device 12n that includes a UID, it will provide the Web page retrieval request to the web server 21. The web server 21, in turn, will provide information from the request to the script execution module 22, which, using one or more scripts from a script store 25 and information provided by the user interaction control module 23, will generate at least a portion of a Web page for transmission by the multiplexer 20 to the client 12n.

The portion of the Web page that is generated by the web server 21 will include at least the textual portion of the Web page requested in the Web page retrieval request, and in one embodiment will be generated in the well-known HyperText Markup Language (HTML). The Web page that is generated may include links identifying, for example, one or more images that are to be displayed as part of the Web page. The links are augmented to identify the UID that was included with the Web page retrieval request. After the web server 21 and script execution module 22 have generated the portion of the Web page to be provided thereby, they can provide the Web page to the multiplexer 20 for transmission over the network 13 to the client device 12n.

The script execution module 22 will also provide information to the user interaction control module 23, including the UID that was received in the Web page retrieval request, as well as identification of any customizations to one or more images that are to be displayed as part of the Web page that were requested in the Web page retrieval request. Since the Web page retrieval request is the first retrieval request for the particular Web page for the session, the Web page retrieval request generally will not include any customizations. The user interaction control module 23 can perform some preliminary processing operations to prepare to render the image(s) when it receives a request therefor from the multiplexer 20, as will be described below.

When the client device 12n receives the portion of the Web page as generated by the web server 21 and script execution module 22 from the server, it can provide it to the browser 14. The browser 14 can display the received portion, and use the links, as augmented to identify the UID for the session, to generate one or more requests, which will typically be image retrieval requests, that are associated with respective ones of the links, to initiate retrieval of respective images for display as part of the Web page. Image retrieval request(s) generated by the browser 14 for the respective images will include both the image identification information from the respective links, as well as the UID with which the links were augmented, to identify the session for which the server 11 is to render the images. The client device 12n transmits the image retrieval requests to the server 11.

The image retrieval requests will be received by the multiplexer 20 and forwarded directly to the user interaction control module 23 for processing, bypassing the web server 21 and script execution module 22. The user interaction control module 23, rendering control module 24 and the rendering engine 27, will render the respective images and provide them to the multiplexer 20 for forwarding over the network 13 to the client device 12n. Generally, the rendering control module 24 will control the rendering operations in connection with information in a scene database that it maintains. The scene database contains information useful in connection with rendering of an image, including (i) a three-dimensional representation of at least a portion of a scene from which a two-dimensional image is to be generated, (ii) information as to the positions and orientations of light source(s) that are used to illuminate the object(s) in the scene, and (iii) the position(s) and orientation(s) of camera(s) that are to be simulated in rendering of the image, relative to the object(s) in the scene, as well as information as to the optical characteristics of the camera(s), such as, for example, the camera(s) magnification or zoom settings.

If Web page retrieval request received requesting an image of a scene did not include any requests for customizations, as will be generally the case for the first image retrieval request for a particular session, the user interaction control module 23 will enable the rendering control module 24 to render the image with selected characteristics, including, for example, particular portions of the scene, light source(s) in particular position(s) relative to the scene, a respective camera in a particular position, orientation and with particular optical characteristics, and the like. The characteristics can be default characteristics, the last valid characteristics of the scene as may be stored in and retrieved from a user database, or other characteristics as will be apparent to those skilled in the art. The image(s) can be provided in any convenient form including, for example, as a bitmap or compressed using any of the well-known compression methodologies. The client device 12n will provide the image(s) to the browser 14, which can display them in regions of the displayed web page reserved therefor.

The Web page displayed by the browser 14 may provide tools or other controls that would allow the user to request customizations of the scene represented by the image. After the user has manipulated one or more of the tools to request one or more customizations, the browser 14 can generate a Web page retrieval request for the same Web page, but with customization information specified for at least one of the images rendered with the scene. The Web page retrieval request will identify, for each image for which customization information is provided, the particular image, as well as the customizations that are to be performed in connection with the scene from which the particular image is to be rendered. A number of types of customizations may be specified, including, for example (i) translation and/or rotation of one or more of the objects in the scene relative to each other or to a coordinate system;

(ii) addition of objects to, or deletion of objects in, the scene;

(iii) changes to the forms of the objects in the scene;

(iv) changes of the material characteristics of objects in the scene (v) the merging of a plurality of scenes to form a new scene;

(vi) changes to the positions and orientations of light source(s) that are used to illuminate the object(s) in the scene;

(vii) changes to the position(s) and orientation(s) of camera(s) that are to be simulated in rendering of the image, relative to the object(s) in the scene, as well as changes to the optical characteristics of the camera(s), such as, for example, the camera(s) magnification or zoom settings, (viii) high-level compound commands, such as "begin driving this car through a city,"

and other types of customizations as will be apparent to those skilled in the art. In addition, the Web page retrieval request will include the UID provided by the multiplexer 20 at the beginning of the session. After the browser 14 has generated the Web page retrieval request, the client device 12*n* will transmit the Web page retrieval request to the server 11 over the network 13.

As before, the multiplexer 20 will receive the Web page retrieval request and provide it to the web server 21. The web server 21 and script execution module 22 will generate the HTML portion of the requested Web page and provide it to the multiplexer 20 for transmission to the client 12*n*, which will include links to the image or images that are to be displayed on the Web page, which, as before, have been augmented with the UID identifying the session for the user. In addition, the web server 21 and script execution module 22 will provide information to the user interaction control module 23 as to (i) the scene(s) for which customization(s) that have been requested, (ii) the particular customizations that were requested to the respective scenes, and (iii) the UID identifying the session for which the customizations have been requested. It will be appreciated that the user interaction control module 23 can use the UID identifying the session for which the customizations have been requested to associate the particular session for which the customizations have been requested. After the user interaction control module 23 receives the customizations that have been requested and the session for which the customizations have been requested, it can perform some preliminary processing operations to prepare to render the image(s) with the respective customizations, as will be described below.

After the client device 12*n* receives the HTML portion of the Web page from the server 11, it will provide it to the browser 14, which can display that portion of the Web page in the same manner as before. In addition, as before, the browser 14 will generate one or more image retrieval requests to initiate retrieval of the image(s) from the server 11. Further, as before, the image retrieval requests will include information from the link(s) that identify the particular image(s) that are to be retrieved, as well as the UID of the session as provided in the augmented links. The image retrieval request(s) will be provided to the client device 12*n*, which, in turn, will transmit the image retrieval request(s) to the server 11.

As before, the image retrieval request(s) will be received by the multiplexer 20, which will provide them to the user interaction control module 23. The user interaction control module 23 will enable the rendering control module 24 to render the image(s) and provide the rendered image(s) to the multiplexer 20 for transmission to the client device 12*n*. In rendering each image, the user interaction control module 23 will enable the rendering control module 24 to render the respective image with the customization(s), if any, that the user requested in the Web page retrieval request. In that operation, if a customization to an image is such as would require customization of the scene as stored in the scene database, the user interaction control module 23 will provide appropriate customizations to the scene database. Depending on the environment in which the server 11 is used, the customization(s) may be such as to provide that they will be used only in connection with the image rendered for the session associated with the particular UID, or, alternatively, in connection with images rendered for all or a subset of the sessions that are contemporaneously engaged in sessions with the same scene in the scene database. In addition, if a customization provides a change to the scene database, including, for example, viewing orientation or the position of the light source(s) illuminating the scene, addition of objects to or deletion of objects from the scene, the user interaction control module 23 can provide information thereof to the rendering control module 24 for use in rendering. If a customization requires an addition of an object to the scene, the user interaction control module 23 can, for example, enable the rendering control module 24 retrieve information from the model database 26 describing the object to be added to the scene. Thereafter, the user interaction control module 23 can enable the rendering control module 24 to render an image, which the rendering control module 24 will provide to the user interaction control module 23. The user interaction control module 23 will, in turn, provide the image to the multiplexer 20, for transmission to the client device 12, for display by the browser. These operations can be performed for each of the images for which image retrieval requests have been received.

With this background, the structure and operation of the user interaction control module 23 and the rendering control module will be described in more detail in connection with FIG. 2. With continued reference to FIG. 2, the user interaction control module 23 includes several components, including a user manager 30, a connection manager 31, an event manager 32, a model manager 33 and a plurality of operators. Generally, in one embodiment, the user interaction control module 23 makes use of operators to perform operations. One operator is a socket gateway operator 34, which receives UID and customization information from the script execution module and image retrieval requests from the multiplexer 20, and provides rendered images to the multiplexer 20 for transfer to respective ones of clients 12*n*. To facilitate rendering of an image, the operators can also be linked together into a graph 35, with the particular operators and sequence thereof in the operator graph being selected to facilitate generation of the image having the desired characteristics. If, for example, an image is to be generated using a scene, and the user has provided a Web page retrieval request in which no customizations have been requested to the scene, an image of which is to be rendered for display on the Web page, which may be the case if, for example, the Web page retrieval request was the first request for the Web page during the respective session, the operator graph may be a default graph for use in rendering images using the particular model.

It will be appreciated that the particular set of operators that are provided for the user interaction control module 23 will depend on the particular environment in which the server 11 is used. In addition to a socket operator for use as the socket gateway, operators that may be advantageously used in connection with the user interaction control module 23 may include such operators as a operators of the object translation operator type, operators of an object rotation operator type, operators of a color operator type, operators of a timekeeper operator type, and operators of a render operator type. An operator of the translation operator type can be used to facilitate updating of the model for a scene in the scene database to translate an object in the scene by a selected distance in a selected direction. For example, if the server 11 is to be used in connection with a game in which objects in the scene are to be moved along a path, an operator of the object translation operator type can be used to translate an object in the scene along a path in the scene. The particular object that is moved, as well as the distance and direction that the object is moved, can be specified as parameters whose values are determined by the image customization information. It will be appreciated that the extent to which an object can actually be moved may be constrained by other features of the scene, including, for example other objects that may be present in the scene.

An operator of the rotation operator type can be used to facilitate updating of the scene in the scene database to rotate an object in the scene by a selected angle around a selected axis. The particular object that is rotated, as well as the angle and direction that the object is rotated, as well as possibly the axis of rotation, can be specified as parameters whose values are determined by the image customization information. For example, if the particular object that is to be rotated is an automobile door, the axis of rotation will comprise the axis specified by the door's hinges, which may be determined by the model of the automobile as stored in the scene database. The angle that the door is rotated around the axis, and the direction of rotation can be specified as parameters whose values are determined by the image customization. It will be appreciated that the angle that the object may be rotated around any particular direction may be constrained by other objects in the scene, including other components of the automobile.

An operator of the color operator type can be used to change the color of at least a portion of the surface of an object in the scene. A color operator can operate by editing parameters of shaders that are provided in the scene database in response to image customization information.

An operator of the timekeeping operator type can be used to provide a time stamp or value to respective client devices 12n. If the server 11 is being used in connection with, for example, a game, the time stamp or value as generated by the timekeeping operator can be transmitted to the client devices 12n of all of the users who are playing the game to provide them with a common time reference. The time stamp or value can identify the particular time as determined by the server 11, and can be provided to, for example, the script execution module 22 for use in the HTML portion of the Web page when it generates that portion for transmission to a client device 12n.

An operator of the rendering operator type can be used to initiate and control rendering of an image by the rendering engine 27.

Other types of operators useful in the server 11 will be appreciated by those skilled in the art. For example, an operator type can be provided to control the position, angular orientation, zoom/focal length, aperture setting, and so forth of a camera. In addition, an operator type can be provided to control the position, angular orientation, color, brightness, and so forth of a light source. In addition, a high-level operator type can build on and utilize operators of other operator types to perform compound operations such as moving an object on a motion path controlled by gravity or moving a car door between the "open" and "closed" states automatically.

At least some of the types of operators may also be of one of two subtypes, including a private subtype and a public subtype. An operator of the private subtype is used to provide a customization that is only visible in the image(s) that are to be subsequently rendered of the particular scene for the particular session identified by the particular UID that is associated with the image customization information that requested the customization, or for a selected subset of UID's that are contemporaneously using the scene. On the other hand, an operator of the public subtype is used to provide a customization that is visible in the image(s) that are to be subsequently rendered of the particular scene for all or possibly a larger subset of UID's that are contemporaneously using the scene. The server 11 provides for several privatization levels, so that, for a lower level, a customization will be visible in images that are subsequently rendered of the particular scene for the particular session identified by the selected subset of UID's that are contemporaneously using the scene, and, for a higher level, a customization will be visible only in the image(s) that are to be subsequently rendered of the particular scene for the particular session identified by the particular UID that is associated with the image customization information that requested the customization.

The user interaction control module 23, in generating an operator graph 25 to facilitate rendering of an image of a scene, will instantiate operators of the required types and link them together to form the operator graph 35. The user interaction control module 23 can perform these operations after it receives the image customization information and UID associated with a Web page retrieval request from the script execution module. This will allow the operator graph to be ready when an image retrieval request is received for the particular image. After the image retrieval request, the user interaction control module 23 can initiate execution of the various operators in the graph to, in turn, initiate rendering of the image.

The user manager 30 is provided to keep track of UID's and converts between UID's and identifiers, referred to as RID's (rendering session identifiers) that are used to keep track of rendering sessions by the rendering control module 24.

The model manager 33 and connection manager 31 cooperate to create operator graphs 35 in response to image customization information provided by the script execution module 22 in response to Web page retrieval requests from the respective client devices 12n. When the model manager 33 receives image customization information from the script execution module 22 relating to an image that is to be rendered, it will determine the operators of the respective types that are to be used in the operator graph 35, instantiate the operators and determine the topology of the operator graph, that is, how the operators are to be linked together to form an operator graph 35. The connection manager 31 will perform the actual linking. Each operator has at least one input and an output, and the model manager 33 will determine, for each input of each operator, the respective operator that is to provide a value or status information for the respective input. The operator that is to provide a value or status information for an input of an operator is upstream of that operator, and the operator whose input is to receive the value or status information is downstream of the operator that is to provide the value or status information. The connection manager 31 will perform the actual linking of the operators that have been instantiated by the model manager to form the operator graph 35.

The model manager 33 can determine the types of operators that are to be used from the image customization information that is provided by the script execution module 22. For example, if the image customization information is to enable an object to be translated a predetermined distance in a particular direction, the model manager 33 can instantiate an operator of the translation operator type, and provide as parameters such information as, for example, the identification of the object that is to be translated, the direction that the object is to be translated and the displacement along the particular direction. Similarly, if the object is to be rotated around an axis, the model manager 33 can instantiate an operator of the rotation operator type, and provide as parameters such information as the identification of the object that is to be rotated, the position and orientation of the axis around which the object is to be rotated, the direction around the axis that the rotation is to take place and the angle through which the object is to be rotated. In addition, if the color of the object is to be customized from a default color, the model manager 33 can instantiate an operator of the color operator type, and provide as a parameter the color to which the object is to be customized.

The model manager 33 and connection manager 31 can instantiate and link corresponding operators for every object that is to be translated, rotated and whose color is to be customized, and link them into the operator graph that is to be used to control the rendering of the image associated with the image customization information. The particular order in which the operators are connected in an operator graph 35 may be determined by several factors, including whether the operators commute, that is, whether, if image customization information requires usage of operators of two types, the two operators can be applied in any order and provide the same result. Generally, for example, if an image customization requires operators of the translation operator, rotation operator and color operator type, operators of the respective type can be applied in any order. Generally, the operator of the rendering operator type will be expected to be one of the last operators in the operator graph 35, after all of the operators instantiated to update the model of the scene in the model database 26. The socket gateway 34, which, as noted above, is also an operator, will be both the first and the last operator in the operator graph 35. When the multiplexer 20 receives an image retrieval request from a client 13n, the multiplexer 20 will notify the socket gateway and provide information identifying the UID and an identifier identifying the image that is to be rendered to the socket gateway 34 to initiate execution of the operator graph to facilitate updating of the model of the scene in the model database 26, if necessary, and rendering of the image. After the image is rendered, it will be provided to the socket gateway 34 for provision to the multiplexer 20 and transmission to the particular client device 12n that issued the image retrieval request.

The event manager 33 controls execution of the operators that comprise an operator graph and, in that case, manages events that occur during execution. Generally, the event manager 33 controls execution of the operator graph 35 according to a "data flow" paradigm, in which an operator in an operator graph 35 is executed when all of its inputs, which include both values of parameters provided by the image customization information provided in the Web page retrieval request and values and/or status information that are provided by operators that are upstream of the respective operator in the operator graph 35, have been provided with respective values and/or status information. The status information may merely indicate that an upstream operator in the graph has finished execution. Accordingly, if, for example an operator graph 35 includes operators of the translation operator, rotation operator and color operator type, to translate, rotate and change the color of the same object, followed by an operator of the rendering operator type, the event manager may enable the operators of the translation operator, rotation operator and color operator type in any order. Before the operator of the rendering operator type can be executed, the operators of the translation operator, rotation operator and color operator types will need to provide status information that indicates that they have successfully finished execution. As each respective operator of the translation operator, rotation operator and color operator type is executed, it will update the scene in the scene database, and will generate status information to indicate when they are finished, which is provided to the rendering operator as an input. After all of the operators of the translation operator, rotation operator and color operator type, as well as operators of other types that may be provided, have finished execution, the event manager 33 will note that all of the inputs to the rendering operator have received status information indicating that the operators upstream thereto had successfully completed, the event manager 32 can enable the operator of the rendering operator type to be executed.

The event manager 32 can enable operator graphs comprising instantiated operators of any combination of operator types, connected in any of a number of topologies, to be executed in a similar manner.

The event manager 32 can initiate execution of an operator graph 35 at any operator in the operator graph 35. As will be described below in more detail, if during execution of an operator, an input value is needed from another operator to allow for continued execution of the operator, execution of the one operator can be suspended, and the other operator executed to allow for generation of the input value that is needed by the one operator. By allowing for execution of operators in this manner, if it turns out that a value generated during execution of one operator is not needed for another operator, which may occur if, for example, rendering of an image is aborted.

As noted above, the model manager 33, in response to image customization information from the script execution module 22, initiates creation of an operator graph 35 to facilitate rendering of an image of a scene with the customizations, if any, requested in a Web page retrieval request. In addition, the model manager 33 can enable models of objects, that are stored in the model database 26, and that may be needed in the scene database associated with a scene, to be loaded into the respective scene database.

The rendering control module 24, while an operator graph 35 is being executed to facilitate rendering of an image, controls updating of a scene from which the image is to be rendered as represented in the scene database in response to execution of operators of the respective types. In addition, the rendering control module 24 controls rendering of the image during execution of an respective operator of the rendering operator type. The rendering control module 24 comprises an API control module 40, a job manager 41, a world/session/transaction manager 42, and one or more scene databases 43. The rendering engine 27 performs actual tessellating and rendering operations during execution of an operators of the respective operator type.

The world/session/transaction manager 42 manages "worlds," "sessions" and "transactions." Generally, a transaction bounds a set of consistent database operations in connection with the scene database 43. For example, rendering is considered a transaction because rendering requires a consistent view of the scene in the scene database 43 that must not be changed during the rendering operation. Similarly, a modification to a scene is also a transaction, since typically a modification to the scene requires incremental changes to many scene data elements in the scene database all of which need to be performed as a unit to ensure that the scene in the scene database 43 remains consistent. For example, generally, an object that is actually present in the scene is represented by an object type and an instance, so that, if a scene contains two objects of the same object type, that can be represented in the scene database 43 by one object type and two instances, all of which are scene data elements. If it is necessary to delete an object, represented by object type and instance scene data elements, both the object type and instance scene data elements will need to be deleted as a unit. This will ensure that problems do not arise in connection with the rendering engine 27, which can occur if, for example, during rendering of the scene, the object type scene data element has been deleted but not the instance scene data element, since at some point the rendering engine 27 will need to attempt to access the deleted object type scene data element.

A session as managed by the world/session/transaction manager 42 generally corresponds to a session with a client device 12n. Worlds are used to disambiguate multiple scenes that may be used for client devices 12n that are concurrently engaged in sessions with the server 11, and particularly may be used to disambiguate scene data elements of the respective scenes that may have similar names. For example, if two different scenes both call their cameras "cam," if a customization to the camera is requested for a scene being used for one session, that customization should only be made in that scene, and not in the other scene.

The API control module 40 controls updating of the scene and rendering of an image in one or more jobs, and the job manager 41 schedules the jobs based on selected criteria. In one embodiment, the criteria includes such issues as job age, whether a job is a prerequisite for a number of other jobs, job "cost," and other criteria as will be described in more detail below. The age of a job can be a desirable criteria since delaying processing of a job based on other criteria can be undesirable to completion of rendering of the image(s) that depend on the delayed job. The job "cost" criteria may be a function of other criteria including, for example, an estimate of the processing time required to execute the job, or to finish execution of the job if execution is suspended, an estimate of the amount of various processing resources, such as memory, that may be required, and the like. A job for which the estimate of the processing time and/or required processing resources is higher will generally have a higher cost associated therewith than a job for which the estimate is lower. In one embodiment, jobs associated with higher costs will be processed on a preferential basis over jobs with lower costs, which can increase the likelihood of that the jobs relating to rendering of an image, which may be processed in parallel, can be completed in less time than otherwise.

As noted above, the rendering engine 27 performs the actual rendering operations required to render the image. In one embodiment, the rendering engine 27 comprises Mental Ray Version 3.0, available from Mental Images, G.m.b.H., & Co., KG, Berlin, Germany, although other rendering engines, such as OpenGL can be used. Generally, the rendering engine 27 performs tessellation of the scene data elements of a scene in the scene database 43 as necessary prior to rendering an image of the scene, and thereafter renders an image. The rendering engine 27 need not tessellate all of the scene data elements of a scene before it begins rendering an image; the rendering image 27 can instead tessellate a portion of the scene data elements before rendering an image of the portion that has been tessellated, and repeat these operations as necessary to render the image as desired. It will be appreciated that the rendering engine 27 need only tessellate portions of those scene data elements that will be depicted in an image that is to be rendered.

The elements of the rendering control module 24 will be described in detail in connection with FIG. 2. As noted above, the rendering control module 24 comprises the API control module 40, the job manager 41, the world/session/transaction manager 42 and the scene database 43. The API control module 40 operates as the interface among the user interaction control module 23 and the other elements of the rendering control module 24 and the rendering engine 27. In that function, the API control module 40 receives calls from the user interaction control module 23 when an operator graph 35 is executed, and provides status information and, while an image is being rendered or after the image has been rendered, provide either the portions rendered or the entire image to the user interaction control module 23. The status information provided by the API control module 40 may be used by elements of the user interaction control module 23 during execution of an operator graph 35. For example, as noted above, operators comprising an operator graph 35 may be executed in any order and, if, in executing an operator, the rendering control module 24 determines that it needs an input value from an operator that is upstream of the operator being executed, the API control module 40 will provide status information to so notify the user interaction control module 23. After receiving the status information, the user interaction control module 23, in particular the event manager 32, can enable the operator that is to provide the needed value to be executed. Any number of such sequences, one per user, may be in progress simultaneously Execution of an operator generally entails performing one or more jobs. For example, loading an object from the model store 26 into the scene database 43 can entail several jobs, including, for example, retrieval of data describing the object from the model store, converting the data from, for example, a form that might be used by a computer-assisted design ("CAD") system to a form that would be useful to the rendering engine 27, and loading the converted data into the scene database 43 and linking it to the respective scene. Each of these operations can be performed as a respective job, or multiple jobs. Similarly, rendering an image can entail several jobs, including rendering a rectangle, loading a texture, tessellating a surface, and so forth. The job manager 41 manages the jobs that are concurrently being executed so they will be executed in an efficient manner. This will allow the server 11 to provide Web pages and rendered images to a number of clients 12n concurrently with minimal delay. The job manager 41 maintains a dependency graph 44 of jobs that are to be executed, with each of the jobs being annotated with a job cost value indicating the respective job's job cost value as described above. When a job of a particular type is first linked into the dependency graph 44 of jobs to be executed, it can be accompanied by a job cost value that is an initial estimate. As the job manager 41 executes jobs of the respective job type, it can keep track of the resources that are used and update the job cost value for use when a job of the same type is subsequently executed.

As noted above, operators can be public or private, with several levels of privacy. Scene elements in the scene database 43 can also be public or private, with corresponding levels of privacy. If, for example, a private translation operator is provided in an operator graph associated with a particular UID to facilitate translation of an object in a scene, the scene element(s) in the scene database 43 that represents the object as translated will be also be private. In addition, jobs are of public and private subtypes, with corresponding levels of privacy, and the job(s) that are executed during execution of an operator of the public will correspond to the public/private subtype of the operator for which they are executed.

The job manager 41 enables other modules, such as the world/session/transaction manager 42 and, in particular, the rendering engine 27, to perform the individual jobs, and in addition controls access to the scene information in the scene database 43. In one embodiment, the scene database 43 is in the form of a cache, in which design information for objects that are to in a scene can be loaded using model information from the model store 26. As the amount of data in the scene database 43 increases, the job manager 41 can select data to be removed from the scene database 43. A number of selection criteria can be used to determine which data is to be removed from the scene database 43. One embodiment makes use of a pin counter (not shown) associated with each element of screen data. When a module that needs to make use of an element of scene data issues an access request for the element, it increments the pin counter, and when the module is finished with the element, it decrements the pin counter. Each element of scene data is also associated with an access sequence value, and, when a module issues an access request for an element, an integer is incremented and provided as the element's access sequence value. Each scene data element whose associated pin counter has the value "zero" is a scene data element for which all of the modules that needed to use the scene data element concurrently have finished using the scene data element. In that case, the scene data element can be deleted from the scene database 43. It will be appreciated, however, that, although no modules are then using the scene data element at that point in time, a module may subsequently need to use the scene data element.

Since generally the likelihood that a module will subsequently need to use a scene data element will decrease the longer it has been since it was last used, the job manager 41 can sort the scene data elements whose pin counters have the value "zero" by access sequence values; it will be appreciated that the least recently accessed scene data elements will be those for which access sequence values are relatively low and the most recently accessed scene data elements will be those for which access sequence values are relatively high. Preferably, the job manager 41 will select one or more scene data elements for deletion for which access sequence values are relatively low on the sorted list. However, since it will generally not be efficient to simply delete the oldest scene data element, since that scene data element may be relatively small, the job manager 41 also takes the size of the respective scene data elements into account when selecting scene data elements for deletion, by scaling the scene data elements' sizes in relation to their relative position on the sorted list, and selecting for deletion the scene data elements in order of their scaled sizes. That is, if there are "n" scene data elements in the sorted list, i=0, 1, 2, ..., n−1, where i=0 is the last scene data element (that is, most recently accessed, the scene data element having the highest sequence value) on the list, and i=n−1 is the first scene data element (that is, least recently accessed, the scene data element having the lowest sequence value) on the list, the job manager 41 will generate scaled size values according to $$size_{scaled}^{i} = \frac{size_i}{n-i}.$$

It will be appreciated that the scaled size value $size_{scaled}^{n-1}$ for the first (that is, the oldest) scene data element i=n−1 will correspond to its size $size_{n-1}$, the scaled size value $size_{scaled}^{n-2}$ of the second scene data element i=n−2, will correspond to one-half its size $size_{n-2}$, and so forth, and the scaled size value $size_{scaled}^{0}$ of the last scene data element i=0 will correspond to 1/n its size $size_0$. After generating the scaled size values, the job manager 41 will select one or more scene data elements, from the largest to the smallest according to their scaled size values $size_{scaled}^{i}$ for deletion, as may be necessary to accommodate scene data elements that are to be loaded into the scene database 43.

The job manager 41 creates a job for linkage into the dependency graph 44 in response to a request therefor during execution of operators in an operator graph 35, or from a module, such as rendering engine 27 or world/session/transaction manager 42, while those modules are executing other jobs. When an operator in an operator graph 35 requests creation of a job, the request is provided to the job manager 41 through the API control module 40. Similarly, when the rendering engine 27 or world/session/transaction manager 42 requests creation of a job, the request is provided to the job manager 41 through the API control module 40. Generally, a job is a request to create a result data set based on values of one or more parameters. The result data set will be stored in the scene database 43. The parameters describe the operation to be performed during execution of the job and possibly other scene data elements that may be present in the scene database 43. In response to a job creation request, the job manager 41 generates a job description data structure that includes such information as:

(i) an operation code that identifies the type of operation to be performed during execution of the job;

(ii) a module identifier identifying the particular module that is to execute the job;

(iii) a status identifier that identifies the status of the job; in one embodiment, possible status identifiers include pending, running, suspended, finished, done, flushed and failed;

(iv) one or more identifiers that identify the scene data element(s) in the scene database that are to be used in executing the job;

(v) one or more identifiers that identify storage locations in the scene database in which results are to be stored during execution of the job;

(vi) an estimate of the job cost value;

(vii) an actual job cost value if the job has finished executing and the status is "done";

(viii) the identification of any prerequisite jobs, that is, jobs that need to be executed before this job begins execution; and (ix) control information such as the identification of the particular thread, on a processing platform that executes programs in threads, or similar structure (generally, "thread"), that is expected to execute the job if the status is pending, or that is executing the job if the job is being executed, caching control information, and so forth.

Items (i), (iv), and (v) can generally be provided as parameters in the job creation request. Generally, the job cost value estimate (item (vi) above) can be based on a number of criteria, including, for example, (a) the apparent complexity of the job, which may be based on, for example, the number of vertices to tessellate if the job is one to tessellate, the number of pixels to render if the job is one to render, the number of photons to cast if the job is one to cast photons from a light source, and the like, which may be adjusted by options such as sampling densities;

(b) the estimated memory requirements for the job; and (c) data transfer delays that may be incurred in obtaining data to be used in executing the job if the prerequisite jobs are executed by different host computers.

In addition, additional factors can be used in connection with a job cost value estimate, including factors such as the number of jobs of the same type that are suspended on the thread that is expected to execute the job or that is executing the job, and other factors as will be apparent to those skilled in the art. It will be appreciated that the job manager 41 may update a job's job cost value estimate in view of changes in, for example, the additional factors noted above.

The job manager 41 uses a number of criteria in selecting a job for execution, including the number of known unresolved prerequisites, that is, jobs that need to be executed before the respective job, to provide a value therefor, but that have not yet been executed, as well as the jobs' job cost value estimate. Preferably, the job manager 41 will select a job with no or relatively few unresolved prerequisites. On the other hand, if a job is a direct or indirect prerequisite for a number of other jobs, it will preferably be executed before jobs that are prerequisites for fewer jobs. In addition, preferably, the job manager will preferably select a job with a relatively high job cost value estimate for execution, which can improve finalization parallelism, as long as respective threads do not exceed a particular concurrent aggregate job cost values for jobs assigned thereto. Generally, the job manager 41 will assign jobs to threads using a number of criteria, including maximizing data locality, minimizing and balancing the number of suspended jobs on a thread to keep stacks small, and other criteria as will be apparent to those skilled in the art. In addition, if, during execution of a job, it is discovered that another job, which was not previously known to be a prerequisite, is in fact a prerequisite, the job manager 41 will preferably assign the newly-discovered prerequisite to the same thread as the job for which it is a prerequisite, for similar reasons.

Generally, the job manager 41 executes jobs as they are necessary to provide data for other jobs. For example, texture image elements are created as placeholders in the scene database 43, but they are empty and have no associated pixel array. When they are accessed for the first time, filing the texture image element necessitates executing an associated texture load job. A job that is accessing the texture image element will be suspended until a texture load job is executed. As another example, generally, an object that has not yet been tessellated may initially be coarsely represented in the scene database 43 by a placeholder in the form of a bounding box. A bounding box may be in the form of, for example, a geometric object having surfaces in the form of, for example, triangles, quadrilaterals or the like, that coarsely bounds the actual object associated therewith. When a ray is sent into a scene, the ray may hit the bounding box. A placeholder for the bounding box will already exist in the scene database 43, but the placeholder will not contain the scene data for the actual object represented by the bounding box. Instead, the placeholder contains a pointer to the job description for the job that is provided to generate the scene data. When the object represented by the bounding box is illuminated, a ray generated to represent the illumination would hit one of the triangles, quadrilaterals, and so forth, that comprises the bounding box in the scene. When that occurs, the scene data representing at least a portion of the actual object will be need to be retrieved from the model store 26, tessellated and stored in the scene database 43, and the job manager 41 will enable respective jobs therefor to be executed, and a job that might be accessing the object will need to be suspended until those jobs are executed. The bounding box essentially operates as a placeholder for the object. The bounding box will not be deleted from the scene database 43 when the object is stored therein, since, as noted above, the object might be deleted from the scene database 43.

More generally, when a job being executed makes an access to a scene data element in the scene database 43, the following operations are performed:
  (i) a module initiates an access to a scene data element in the scene database 43;
  (ii) if the scene database 43 that contains
    (a) a valid scene data element, that is, a scene data element that is not a placeholder, it will provide the scene data element to the module that initiated the access, after which the module can make use of the scene data element; but
    (b) an invalid scene data element, that is, a scene data element that is a placeholder for data that has not yet been created but that is associated with a job description, it will provide a notification thereof to the job manager 41;
  (iii) the job manager 41 will update its job dependency graph 44 to reflect the job for which it received notification from the scene database 43, thereby to enable the job to be executed at some point in the future;
  (iv) the job manager 41 also suspends execution of the thread containing the module that initiated the scene data element access;
  (v) the job manager 41 selects a new job and assigns it to the thread whose execution was suspended; the selection of the job is based on the estimated job cost values of the jobs in the dependency graph 44, and, accordingly, the selected job may, but need not, be the job that was added to the dependency graph 44 (reference item (iii) above); and
  (vi) when a job is finished executing, it will enable data to be stored in the placeholder for the scene data element in the scene database 43 associated therewith.

It will be appreciated that the data stored by a job in the placeholder may be actual scene data, or it may merely be status information indicating that the job has finished executing.

Figure 3:
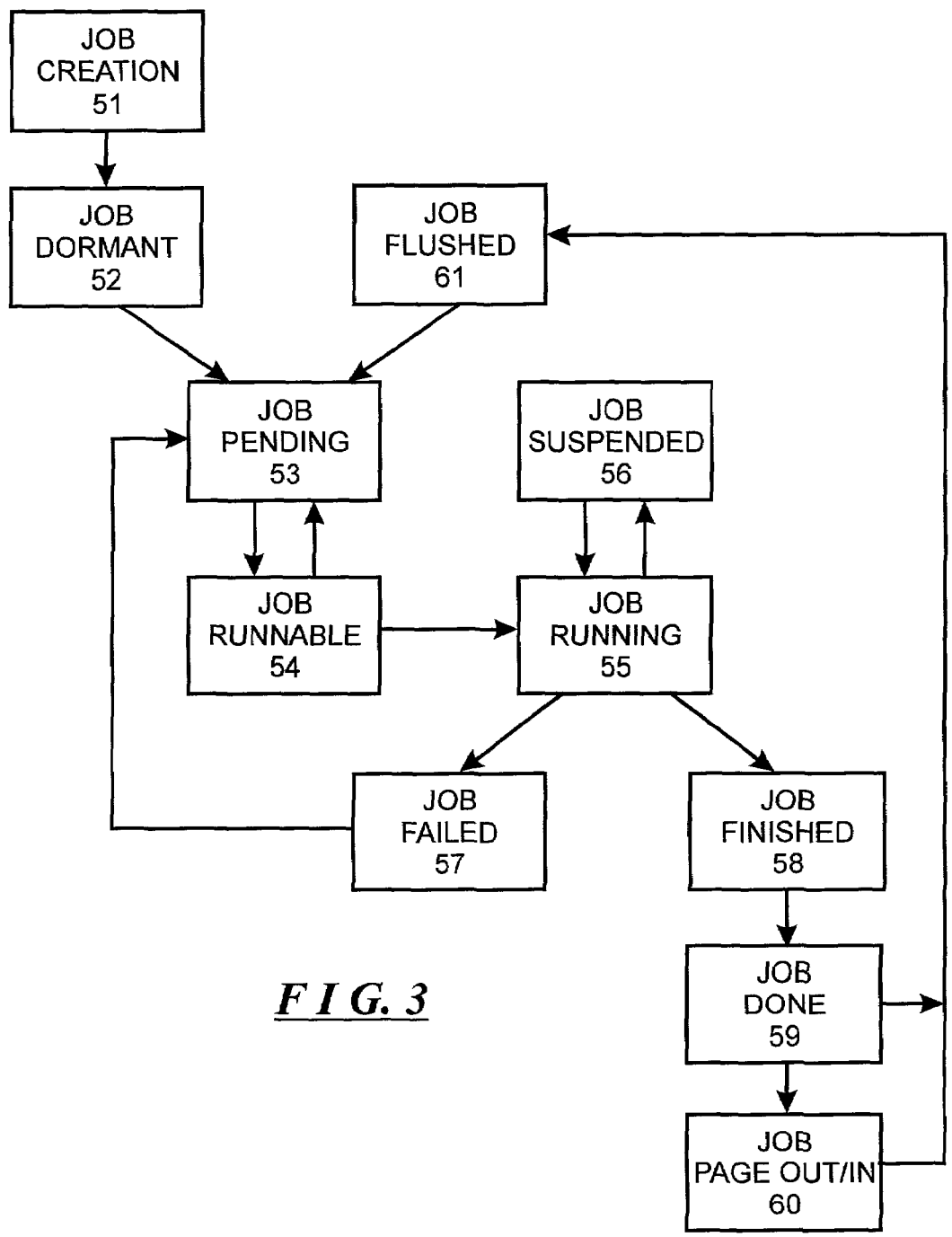
FIG. 3 is a flow diagram useful in understanding operations performed by a user manager in the server depicted in FIG. 2.

The job manager 41 makes use of a state machine to control execution of each job. The current state of each job may be stored in the respective job's job description described above. The job control state machine 50 used by the job manager 41 will be described in connection with FIG. 3. With reference to FIG. 3, in response to a request to create a job, the job control state machine 50 enters a job creation state 51. In the job creation state 51, the job manager creates a job description, as described above, and, in addition, creates a placeholder for the scene data element(s) to be associated with the job in the scene database 43. A module that issues a job creation request may notify the job manager 41 of prerequisite jobs of which it is aware, either as part of the job creation request or subsequent thereto, and the job manager 41 can use that information to link the job in the dependency graph 44. In addition, if a job identified as a prerequisite is not already in the dependency graph 44, the job manager 41 can initiate creation of the job by issuing a job creation request for the job, in which case the prerequisite job will also be linked into the dependency graph 44. After the module that issued the job creation request has provided all of the information required for the creation of the job initiated by the job creation request, including the prerequisites of which it is aware, the module can issue a job creation end request, which marks the end of the job creation state. At that point, the job enters a dormant state 52.

As noted above, a job is not executed until a request for the scene data element that would be generated by the job is issued (reference item (ii) directly above). Accordingly, a job will remain in the dormant state 52 until a request is made for the scene data element that would be generated by the job is issued. At that point, since the scene data element is represented by a placeholder, a job execute request will be generated by the scene database 43 for the job associated with the placeholder, at which point the job will sequence to the pending state 53. In the pending state 53, the job manager 41 will determine whether the job's prerequisite jobs have finished execution, and, if so, the job will enter a runnable state 54. While a job is in the runnable state 54, the job manager 41 can schedule the job for execution, based on the job's estimated job cost value as described above. If, while the job is in the runnable state 54, the job manager 41 identifies a new prerequisite for the job, the job can return to the pending state 53 until the new prerequisite has been executed.

When the job manager 41 assigns the job to a thread, the job enters a running state 55. In the running state, the job is actually being executed. While a job is being executed, a new prerequisite may be discovered, in which case the job manager 41 will sequence the job to a suspended state 56 until the prerequisite can be executed. If, for some reason, an error occurs during execution of the job, the job manager 41 will sequence the job to a failed state 57. If a subsequent execution request is issued for the job, it will return to the pending state 53.

On the other hand, if the module that is executing the thread in which the job is being executed, determines that the job has been successfully executed and is ready to store results in the scene database 43, it will issue a job finished notification to the job manager 41. In response to the job finished notification, the job manager 41 sequences the job to a finished state 58 and issues a notification to the module that it can initiate a storage operation to store the results in the scene database 43. The job manager 41 can control issuance of the notification allowing the module to initiate the storage operation so as to control the timing with which the module can initiate the storage operation. This may be desirable to maintain consistency of scene data for a scene in the d scene database 43 if, for example, other jobs are using the scene data for rendering. After the job manager 41 has issued the notification to the module indicating that it can initiate the storage operation, the module can initiate the storage operation. In one embodiment, the module will initiate a storage operation, not to the placeholder(s) for the job, but to respective temporary storage location(s) in the scene database 43. After the storage operation to the temporary storage location(s) has completed, the module will issue a job storage done request to the job manager 41. In response to the job storage done request, the job manager 41 will sequence the job to a done state 59. In addition, the job manager 41 will enable the information in the temporary storage location(s) to be transferred to the placeholder(s). In one embodiment, the transfer is accomplished by means of updating pointers from pointing to the storage locations associated with the placeholder(s) to point to the temporary storage location(s).

After the job manager 41 has sequenced the job to the done state 59 and updated the pointers, it can sequence the job to a paging state 60, in which it will enable the job descriptor to be transferred from the scene database 43 to, for example, a permanent storage arrangement (not shown) such as a disk storage device. Following the paging state 60, or following the done state 59 if the job is not sequenced to the paging state, a garbage collector maintained by the job manager 41 can delete the job description from the scene database 43 in the manner described above, at which point the job manager 41 sequences the job to a flushed state 61. If the job manager 41 subsequently receives a job execution request requesting subsequent execution of the job, the job manager 41 can return the job to the pending state, at which point the operations described above can be repeated.

The invention provides a number of advantages. In particular, the invention provides a server for use in connection with one or more clients that can render images of scenes for delivery to respective clients. The server can render images of the same scene for a plurality of the clients, and can allow the clients to request customizations of the scene and control those clients for which the customizations will be visible in images rendered therefor. In particular, the server can selectively allow customizations requested by one client to be made in a scene for which images are rendered for, for example, only that client, for a selected group of contemporaneously-connected clients, or for all contemporaneously-connected clients for which images are to be rendered of the scene.

By rendering the images itself, instead of providing three-dimensional scene information to the respective clients, the server ensures that confidential three-dimensional scene information concerning objects in a scene is not provided to the respective clients.

In addition, by allowing images of customized scene to be provided, not only to the client that requested the customization, but also to all or a selected subset of the other clients that are engaged in a session involving the same scene, the server also manages cooperative or competitive efforts by a plurality of users using respective ones of the client, allowing, for example, a plurality of users in diverse locations using respective client devices to cooperatively design a product, a plurality of users in diverse locations to play games, and other efforts as will be apparent to those skilled in the art.

In addition, since rendering is performed by the server, and not by the clients, the arrangement allows clients to be used that have relatively limited storage and processing capacities, such as Web pads, personal data assistants (PDA's), cellular telephones and the like, and still allow for arbitrarily complex manipulation of three-dimensional scene data.

It will be appreciated that numerous changes and modifications may be made to the arrangement as described herein. For example, although the server has been described as rendering images in response to image retrieval requests issued by respective clients, it will be appreciated that the server can render images in response to other events. For example, the server can transmit an updated image to one client in response to an event initiated by another client. This can be useful if, for example, users of the respective clients are engaged in a collaborative design effort, playing a game, or the like. In addition, the server can stream updated images to one or more clients if the images are to represent, for example, video, using any convenient image transfer or streaming video transfer protocol. Furthermore, although the server has been described as providing images rendered in response to requests issued by browsers in connection with links associated with Web pages, it will be appreciated that the image may be rendered and provided in response to requests issued by other types of programs executed by the client devices, in connection with other types of request initiation mechanisms, which need not be associated with a Web page.

It will be appreciated that tools through which a user may request customizations to a scene may be implemented using any type of program. If customizations are requested through Web pages, as described above, the tools may be efficiently implemented by means of, for example, applets provided with the Web pages, which applets may be in, for example, the well-known Java programming language.

It will further be appreciated that a server may be implemented on a single processing platform, or on multiple processing platforms. The scene database 43, for example, may be implemented as a virtual shared database that is distributed across a plurality of processing platforms, and various components of the server may also be distributed across the various processing platforms.

In addition, although specific arrangements have been described by which the job manager 41 determines which jobs are to be executed, determines job cost values and deletes scene data elements from the scene database 43, it will be appreciated that other arrangements can be used. Furthermore, it will be appreciated that, although a specific state machine has been described by which the job manager controls execution of a job (reference FIG. 3), it will be appreciated that other state machines, and arrangements other than state machines, may be used instead.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by a user using user input elements (not shown) which may be connected directly to the system or which may transfer the information to the system over a network or other mechanism for transferring information in a conventional manner.

The foregoing description has been limited to a specific embodiment of this invention. It will be apparent, however, that various variations and customizations may be made to the invention, with the attainment of some or all of the advantages of the invention. It is the object of the appended claims to cover these and such other variations and customizations as come within the true spirit and scope of the invention.

What is claimed as new and desired to be secured by Letters Patent of the United States is:

1. A computer program product for use in connection with a computer to form a server for use in a network including a plurality of clients and a communication link operable to interconnect the server and ones of the plurality of clients, the computer program product comprising a non-transitory computer-readable medium having encoded thereon:

computer readable image rendering code readable by the computer in the server to enable the computer in the server to render, from three-dimensional scene data representing a scene, a two-dimensional image, wherein the three-dimensional scene data representing a scene comprises a model from which a two-dimensional image can be rendered, and wherein rendering comprises generating a two-dimensional image from the model, the rendering code comprising computer readable rendering engine code readable by the computer to enable the computer to configure a rendering engine operable to render at least a portion of a two-dimensional image from the three-dimensional scene data;

computer readable interface code readable by the computer to enable the computer to transmit the two-dimensional image rendered by the rendering engine in the server over the communication link to at least one of the plurality of clients; and computer readable user interaction control code readable by the computer to enable the computer to control interactions with ones of the plurality of clients in connection with rendering of the image from the scene data, the control interactions including requests from at least one client, the requests including scene customization information requesting at least one customization to the scene for the at least one client, the customization being responsive to the requests from the at least one client, the computer readable user interaction control code and the computer readable image rendering code being readable by the computer to enable the computer to render an image of the scene as customized in relation to the customization information responsive to the requests from the at least one client, whereby a user of the client can interactively customize the scene in a manner specific to the at least one client, wherein no rendering is performed by the client, and the client does not generate a two-dimensional image from the model, and wherein the computer image rendering code is readable by the computer in the server to enable the computer in the server to concurrently render an image of the scene for each of a plurality of clients, customized differently for each client in relation to different customization information responsive to different requests from each of the plurality of clients, whereby each of a plurality of users of respective clients can concurrently and interactively customize the scene in different manners specific to each respective client, without rendering being performed by a client, and wherein the computer readable user interaction control code includes (A) computer readable operator graph generation code readable by the computer in the server to enable the computer in the server to generate, when the server is to render the image, an operator graph comprising at least one operator, the at least one operator being configured to enable the computer to perform at least one operation in connection with rendering of the image; and (B) computer readable event manager code readable by the computer in the server to enable the computer in the server to control execution of the at least one operator in response to the occurrence of at least one event.

2. A computer program product as defined in claim 1 in which the at least one customization to the scene can be represented in images rendered for selected ones of clients, the computer readable user interaction control code being readable by the computer to enable the computer to control ones of the clients for whom images are rendered depicting the customization.

3. A computer program product as defined in claim 1 wherein the computer readable image rendering code is readable by the computer in the server to enable the computer in the server to load a texture in the image rendered by the computer, without a client loading a texture into the image.

4. A computer program product as defined in claim 1 in which the computer readable operator graph generation code comprises:

A. computer readable user manager code readable by the computer to enable the computer to select operators of selected operator types for use in the operator graph, and B. computer readable connection manager code readable by the computer to enable the computer to connect the selected operators into the operator graph.

5. A computer program product as defined in claim 4, in which scenes for which images are to be rendered are selected in response to requests therefor, and in which a request can include scene customization information requesting at least one customization to the scene, the computer readable user manager code being readable by the computer to enable the computer to select operators for use in the operator graph in response to the image requested by and scene customization information contained in a request.

6. A computer program product as defined in claim 1 in which the computer readable image rendering code comprises:

A. computer readable scene database code readable by the computer to enable the computer to store, in a scene database, scene data representing at least a portion of the scene for which an image is to be rendered;

B. computer readable customization code readable by the computer to enable the computer to customize the scene data contained in the scene database;

C. the computer readable rendering engine code further being readable by the computer to enable the computer to utilize the scene data in the scene database in connection with rendering at least a portion of an image; and D. computer readable job manager code readable by the computer to enable the computer to control the customization and the rendering in connection with execution of the at least one operator in the operator graph.

7. A computer program product as defined in claim 6 in which, response to execution of the at least one operator, the computer readable job manager code is readable by the computer to enable the computer to establish at least one job, the at least one job being executable by the computer.

8. A computer program product as defined in claim 7 in which, in response to execution of said at least one operator, the computer readable job manager code is readable by the computer to enable the computer to establish a plurality of jobs in a job dependency graph, each job being executable by the computer, and to select ones of the jobs in the graph for execution.

9. A computer program product as defined in claim 8 in which the computer readable job manager code is readable by the computer to enable the computer to select ones of the jobs for execution in relation to respective job cost values associated with the respective jobs.

10. A computer program product as defined in claim 9 in which the computer readable job manager code is readable by the computer to enable the computer to assign respective job cost values in relation to an estimate of server resources used during execution of the associated jobs.

11. A method, executable in a computer, to enable the computer to operate as a server for use in connection with a network including a plurality of clients and a communication link operable to interconnect the server and ones of the plurality of clients, the method comprising:

configuring, in the server, a rendering engine operable to render at least a portion of a two-dimensional image from three-dimensional scene data representing a scene, wherein the three-dimensional scene data representing a scene comprises a model from which a two-dimensional image can be rendered, and wherein the rendering comprises generating a two-dimensional image from the model;

rendering, in the server, from the three-dimensional scene data representing a scene, a two-dimensional image;

transmitting the two-dimensional image rendered by the rendering engine in the server over the communication link to at least one of the plurality of clients; and configuring the server to control interactions with ones of the plurality of clients in connection with rendering of the image from the scene data, the interactions including requests from at least one client, the requests including scene customization information requesting at least one customization to the scene for the at least one client, the customization being responsive to the requests from the at least one client, the server rendering an image of the scene as customized in response to the customization information, whereby a user of the client can interactively customize the scene in a manner specific to the client, wherein no rendering is performed by the client, and the client does not generate a two-dimensional image from the model, and wherein the rendering, in the server, comprises concurrently rendering an image of the scene for each of a plurality of clients, customized differently for each client in relation to different customization information responsive to different requests from each of the plurality of clients, whereby each of a plurality of users of respective clients can concurrently and interactively customize the scene in a different manner specific to each respective client, without rendering being performed by a client, and wherein configuring the server to control interactions with ones of the plurality of clients comprises utilizing (A) computer readable operator graph generation code readable by the computer in the server to enable the computer in the server to generate, when the server is to render the image, an operator graph comprising at least one operator, the at least one operator being configured to enable the computer to perform at least one operation in connection with rendering of the image; and (B) computer readable event manager code readable by the computer in the server to enable the computer in the server to control execution of the at least one operator in response to the occurrence of at least one event.

12. The method of claim 11 wherein the computer in the server loads a texture in the image rendered by the computer, without a client loading a texture into the image.

13. A computer program product for use in connection with a computer to form a server for use in a network including a plurality of clients and a communication link operable to interconnect the server and ones of the plurality of clients, the computer program product comprising a non-transitory computer-readable medium having encoded thereon:

computer readable image rendering code readable by the computer in the server to enable the computer in the server to render, from three-dimensional scene data representing a scene, a two-dimensional image, wherein the three-dimensional scene data representing a scene comprises a model from which a two-dimensional image can be rendered, and wherein rendering comprises generating a two-dimensional image from the model, the rendering code comprising computer readable rendering engine code readable by the computer to enable the computer to configure a rendering engine operable to render at least a portion of a two-dimensional image from the three-dimensional scene data;

computer readable interface code readable by the computer to enable the computer to transmit the two-dimensional image rendered by the rendering engine in the server over the communication link to at least one of the plurality of clients; and computer readable user interaction control code readable by the computer to enable the computer to control interactions with ones of the plurality of clients in connection with rendering of the image from the scene data, the control interactions including requests from at least one client, the requests including scene customization information requesting at least one customization to the scene for the at least one client, the customization being responsive to the requests from the at least one client, the computer readable user interaction control code and the computer readable image rendering code being readable by the computer to enable the computer to render an image of the scene as customized in relation to the customization information responsive to the requests from the at least one client, whereby a user of the client can interactively customize the scene in a manner specific to the at least one client, wherein no rendering is performed by the client, and the client does not generate a two-dimensional image from the model, and wherein the computer image rendering code is readable by the computer in the server to enable the computer in the server to concurrently render an image of the scene for each of a plurality of clients, customized differently for each client in relation to different customization information responsive to different requests from each of the plurality of clients, whereby each of a plurality of users of respective clients can concurrently and interactively customize the scene in different manners specific to each respective client, without rendering being performed by a client, and wherein the computer readable image rendering code is readable by the computer in the server to enable the computer in the server to load a texture in the image rendered by the computer, without a client loading a texture into the image.

* * * * *